Patented Mar. 5, 1946

2,396,210

UNITED STATES PATENT OFFICE 2,396,210

XANTHATES OF HYDROLYZED INTERPOLYMERS

William H. Sharkey, Wilmington, Del., assignor to E. I. du Pont de Nemours & Company, Wilmington, Del., a corporation of Delaware No Drawing. Application June 18, 1942,
Serial No. 447,590

8 Claims. (Cl. 260—79)

This invention relates to new compositions of matter and more particularly to xanthates of hydrolyzed interpolymers of vinyl organic esters with another polymerizable compound containing a single ethylenic double bond the terminal carbon atoms of which double bond are free of oxygen, and to processes for preparing such xanthates.

Polymeric alcohols derived by the hydrolysis of interpolymers of a vinyl organic esters with another polymerizable compound containing a single ethylenic double bond the terminal carbon atoms of which are free of oxygen (i. e., a polymerizable compound in which the terminal carbon atoms of the double bond are connected only to elements of the group consisting of hydrogen, carbon, halogen, and nitrogen) give excellent fibers and films and possess other valuable properties which render them potentially valuable as modifying agents, particularly for viscose. However, these polymeric alcohols are substantially water-insoluble and this fact renders their application from solution difficult for the obvious reasons that to obtain and use solutions thereof entails the handling and recovery of expensive solvents, and in many applications involving aqueous systems, such as the modification of viscose solutions for fiber and film production, the difficulties of using these polymeric alcohols as such appear insurmountable. Hence, it would be desirable to convert the water-insoluble polymeric alcohols above defined to water-soluble derivatives from which the polymeric alcohols could later be readily regenerated in existing equipment.

An object of this invention, therefore, is to provide water-soluble derivatives of hydrolyzed interpolymers of vinyl organic esters with another polymerizable compound containing a single ethylenic double bond the terminal carbon atoms of which bond are free of oxygen.

Another object is to provide water-soluble derivatives of said hydrolyzed interpolymers which derivatives are capable of being regenerated by heat or acid to give water-insoluble fibers and films of the hydrolyzed interpolymer.

Another object is to provide water-soluble derivatives of said hydrolyzed interpolymers for use in fiber- and film-forming compositions.

Still another object is to provide a simple and inexpensive process for producing derivatives of said hydrolyzed interpolymers.

A still further object is to provide water-soluble derivatives of hydrolyzed interpolymers of ethylene with a vinyl organic ester, which are capable of being regenerated by heat or acids to give fibers and films of the water-insoluble hydrolyzed interpolymers of ethylene with vinyl organic ester, and which are useful in fiber- and film-forming compositions.

These and other objects will more clearly appear hereinafter.

The above objects are realized by this invention which, briefly stated, comprises forming alkali alcoholates of hydrolyzed interpolymers of a vinyl organic ester with another polymerizable compound containing a single ethylenic double bond the terminal carbon atoms of which are free of oxygen, by the action of an alkali metal alkoxide upon the hyrolyzed interpolymer. Thereafter the alkali alcoholate of the hydrolyzed interpolymer so produced is reacted with carbon disulfide to obtain water-soluble alkali metal xanthates of the hydrolyzed interpolymers.

The term "vinyl organic ester" as used herein refers to a vinyl ester of an organic acid.

Preferred hydrolyzed interpolymers for the purposes of this invention are those obtainable by hydrolyzing the interpolymers of ethylene with vinyl acetate, according to the procedure set out in copending application Serial No. 446,114 filed June 6, 1942, and briefly described in Example I herein.

A suitable method of preparation of the alkali alcoholate of the hydrolyzed interpolymers employed in this invention is as follows: A hydrolyzed interpolymer of a vinyl organic ester and another polymerizable compound containing a single ethylenic double bond the terminal carbon atoms of which double bond are connected only to elements of the group consisting of hydrogen, carbon, halogen and nitrogen, is dissolved in ethanol and this solution, together with an excess of sodium ethylate (or an excess of sodium metal added slowly) dissolved in ethanol solution, is introduced into a reactor fitted with an agitor and an opening to allow distillation. Benzene is added and distillation started using vigorous agitation. As distillation proceeds, more benzene is added. Distillation is continued, followed by addition of benzene and, in turn, by further distillation. This procedure is continued until all alcohol has been removed, i. e., the distillate no longer reacts with sodium metal. The reactor now contains a benzene suspension of the sodium alcoholate of the hydrolyzed interpolymer, which is separated on a filter and sucked dry.

The alkalized interpolymer is converted to the xanthate as follows: In a reactor is placed the alkalized interpolymer, together with molar proportions of carbon disulfide (i. e., one CS₂ for each —ONa group in the reaction mixture) or with an excess, e. g., a 10% excess, of this reagent. The reactor is sealed and agitated 4–12 hours at room temperature. At the end of that time the contents of the reactor are dissolved in an equal weight of water. The xanthated material dissolves, but unreacted interpolymer remains undissolved. A reddish brown solution of the xanthate is separated by filtration. An alternative method of xanthation is to allow the dry sodium alcoholate of the hydrolyzed interpolymer to interact with carbon disulfide at 20°–25° C. Since this reaction is exothermic, it must be cooled at the outset. The reaction is essentially complete in 4–5 hours, and the reaction mixture can then be dissolved in an equal weight of water or dilute caustic soda. Filtration of the reaction mixture leads to a clear aqueous solution of the xanthate.

The reactions involved in the preparation of the xanthates from the hydrolyzed interpolymers are represented below. For convenience of illustration the reactions are presented for 100% xanthation of a completely hydrolyzed ethylene-organic vinyl ester interpolymer.

(1) 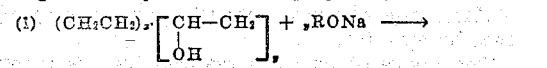 

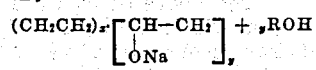
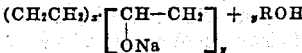

(2) 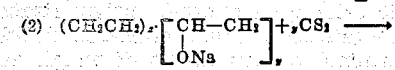 

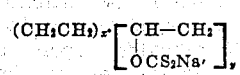
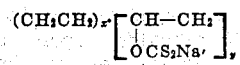

In these equations $x$ and $y$ are integers whose size depend upon the molecular weight of the interpolymer and the relative amounts of ethylene and organic vinyl ester (hydrolyzed) present. The molar ratio of ethylene to vinyl ester represented in the interpolymer is $x:y$. In the equations R represents an alkyl radical. In practice some of the hydroxyl groups in the hydrolyzed interpolymer generally remain unchanged so that the xanthate will contain some free hydroxyl groups.

The following examples further illustrate this invention. Proportions are given in parts by weight unless otherwise specified.

*Example I*

A pressure vessel is charged with 440 parts of vinyl acetate, 200 parts of oxygen-free water, 2 parts of chlorosulfonated white oil, and 0.6 part of benzoyl peroxide. The reactor is swept out with oxygen-free nitrogen, evacuated, and charged with ethylene to a pressure of 205–315 atmospheres. The reaction is carried out at 74°–76° C. for ten hours with constant agitation. More ethylene is introduced from time to time as the pressure drops. The total pressure drop during the reaction is 460 atmospheres. The pH before reaction starts is adjusted from 6.5 to 3.5 by means of dilute formic acid. At the end of the reaction the pH is 3.9. Two hundred fifty-six (256) parts of interpolymer (37% conversion) containing 1.7 mols of ethylene per mol of vinyl acetate is obtained. The interpolymer is freed from volatile impurities by steam distillation of the reaction mixture and is then washed and dried on a rubber mill.

One hundred thirty-five (135) parts of the above interpolymer is dissolved in a mixture of 634 parts of toluene and 576 parts of ethanol. After solution is complete, 85 parts potassium hydroxide dissolved in 394 parts of ethanol is added. This mixture is heated at the boiling temperature for five hours. The hydrolyzed interpolymer (110 parts) thus obtained is freed from volatile impurities by steam distillation after which it is washed with water and dried at 60°–70° C. The essentially completely hydrolyzed interpolymer softens at 115°–120° C.

Two and a half (2.5) parts of sodium is dissolved in 118 parts of ethanol. When the reaction is complete, 4.1 parts of the above hydrolyzed ethylene-vinyl acetate interpolymer and 130 parts of toluene are added. The temperature of the reaction mixture is raised to effect distillation of the volatile components. As distillation proceeds, more toluene is added. This process is repeated until all of the ethanol has been removed. The remaining residue, which contains the sodium alcoholate of the hydrolyzed interpolymer, is cooled and 6.8 parts of carbon disulfide are added. After standing sixteen hours at room temperature, the mixture is diluted with water, filtered, and the water layer of the filtrate separated. The water layer consists of a solution of the sodium xanthate of the hydrolyzed interpolymer. On acidifying this solution the water-insoluble hydrolyzed ethylene-vinyl acetate interpolymer is regenerated and separates as a precipitate.

*Example II*

The hydrolyzed ethylene-vinyl acetate interpolymer described in Example I is introduced into a reaction vessel containing 10 parts of sodium metal dissolved in 513 parts of ethanol. This mixture is heated until solution is complete. The equipment is so designed that the mixture can be internally agitated and ethanol removed by distillation. As distillation proceeds, toluene is added, and distillation continued until all of the ethanol has been removed. The residue in the reactor is cooled at 25° C. and to it is added 33 parts of carbon disulfide. The resulting mixture is stirred well for 5.5 hours at room temperature. To this reaction mass is added 100 parts of water with good agitation, whereupon a gel collects at the junction of the toluene and water layers. This gel is separated on a filter, washed well with acetone, and dried under reduced pressure at 20° C. The difficultly water-soluble, dry sodium xanthate is analyzed within twelve hours after its preparation. Analysis shows the presence of 13.98% sulfur corresponding to xanthation of 25.5% of the hydroxyl groups in the hydrolyzed interpolymer.

*Example III*

Ten parts of interpolymer obtained by hydrolyzing an ethylene-vinyl acetate interpolymer containing 3 mols of ethylene per mol of vinyl acetate, and 158 parts of ethanol are placed in a reaction vessel having three openings. To the center opening is connected an agitating device; one of the side openings is connected with a device for adding liquids; the other side opening is connected to a reflux condenser. This mixture is agitated and heated to the boiling point of ethanol. After solution is complete, the reaction vessel is cooled to room temperature and 21 parts of metallic sodium is added slowly. After hydrogen evolution has ceased, 176 parts of benzene is added and distillation started using vigorous agitation throughout. As distillation proceeds, more benzene is added and distillation continued until all of the ethanol has been removed. As the ethanol is removed, the sodium alcoholate of the hydrolyzed interpolymer precipitates from solution as a fine powder. The powder is separated from the benzene by filtration and placed in a large porcelain container, together with 38 parts of carbon disulfide. The container is sealed and agitated for 4.5 hours at room temperature. The contents of this container are then dissolved in an equal weight of water. The resulting solution is filtered through a glass fritted funnel. Ten parts of the filtrate upon acidification with hydrochloric acid yields 0.73 part of hydrolyzed interpolymer. The xanthate solution reacts with N-diethyl chloroacetamide to give a stable derivative the analysis of which indicates 46.7% xanthation has been effected.

The above solution is cast on a glass plate and heated to 110°–120° C. for 45 minutes. The plate is then immersed in 18% ammonium sulfate solution for 5–10 minutes during which time extensive decomposition of the residual xanthate occurs. The film of regenerated hydrolyzed ethylene-vinyl acetate interpolymer thus obtained is removed from the plate and washed first in dilute sulfuric acid-ammonium sulfate solution and then in water. The film, after drying in air, is brown and opaque.

*Example IV*

A reactor having three openings is charged with 552 parts of ethanol and 30 parts of hydrolyzed ethylene-vinyl acetate interpolymer obtained by hydrolyzing an interpolymer containing 1 mol of ethylene per 1.17 mols of vinyl acetate. The center opening is connected to an agitator, one of the side openings is fitted with a device for adding liquids, and a reflux condenser is attached to the other side opening. To the mixture is added 22 parts of metallic sodium in small portions. After hydrogen evolution is complete, 176 parts of benzene is added and the apparatus arranged for ordinary distillation. Distillation is started and as it proceeds more benzene is added. This procedure is continued until all of the ethanol has been removed. As the ethanol is removed, the sodium alcoholate of the hydrolyzed interpolymer separates as a fine suspension. This sodium compound is separated from the benzene by filtration and is then placed in a porcelain reaction vessel, together with 113 parts carbon disulfide. The reaction vessel is sealed and rotated for two days at room temperature to convert the sodium alcoholate into corresponding xanthate. At the end of that time the contents of the reaction vessel are dissolved in an equal weight of water and the resulting solution filtered through a glass fritted filter. Ten parts of the xanthate solution obtained as the filtrate regenerates 0.79 part of the hydrolyzed interpolymer upon acidification with hydrochloric acid. Another portion of the xanthate solution is reacted with N-diethyl chloroacetamide to give a stable derivative containing 23.69% sulfur. This indicates that 80% of the hydroxyl groups in the original hydrolyzed interpolymer were xanthated. A film of regenerated hydrolyzed interpolymer can be formed from this solution by the same procedure as described in Example III. The xanthate solution on incorporation into viscose, followed by spinning, gives a yarn having a dry tenacity of 1.9 g./d. and a wet tenacity of 0.9 g./d.

*Example V*

Seventy-five parts of sodium is added in small portions to 789 parts of ethanol and the resultant solution is added to a solution of 100 parts of hydrolyzed ethylene-vinyl acetate interpolymer (obtained by hydrolyzing an ethylene-vinyl acetate interpolymer containing 1.3 mols of ethylene per mol of vinyl acetate) in 1183 parts of ethanol contained in a reactor having 3 openings. To one opening is fitted an agitator, to another a condenser for distillation, and to the third a device for adding liquids. The solution is agitated and distillation is started. When the volume has been reduced by one-half by distillation, 878 parts of benzene is added and distillation continued until the volume is again reduced by one-half. Then a further amount of benzene (878 parts) is added and distillation to dryness carried out under reduced pressure (30 mm.). This last operation is repeated twice more. At this point the ethanol has been completely removed and a mixture of sodium ethylate and the sodium alcoholate of the hydrolyzed ethylene-vinyl acetate interpolymer remains in the reactor. The distillation condenser is then replaced with a reflux condenser and precautions taken to exclude atmospheric moisture. The reactor is cooled to 10° C. Then 565 parts of carbon disulfide is added through the device for adding liquids and the resulting mixture is stirred for 36 hours as the temperature is allowed to rise to 17° C. At the end of the reaction period, acetone is added to dissolve unreacted carbon disulfide and the acetone-insoluble residue is dissolved in 200 parts of water to give a viscous, reddish-brown solution. Unreacted carbon disulfide not removed by solution in acetone is removed from this solution by the application of reduced pressure. The solution is then filtered through filter cloth under 90 lbs./sq. in. pressure to remove any insoluble material. Ten parts of the filtered solution, which resembles viscose in appearance, regenerates 2.7 parts of hydrolyzed interpolymer when treated with excess hydrochloric acid. Films and fibers can be formed from this solution by heat or acid regeneration of the polymer from the xanthate as described in Example III.

*Example VI*

This example illustrates the preparation and xanthation of a hydrolyzed methyl methacrylate-vinyl acetate interpolymer.

One hundred eleven parts of distilled water and 7.8 parts of sodium hexadecanol-1 sulfate are warmed until solution is complete. This solution is then introduced into a pressure vessel together with 3 parts of methyl methacrylate, 57 parts of vinyl acetate, and 0.6 part of ammonium persulfate. The pressure vessel is agitated at 45° C. for 40 hours. The contents are then steam distilled and the interpolymer coagulated with aluminum sulfate. The coagulated interpolymer, which contains 1 mol of methyl methacrylate per 22 mols of vinyl acetate, is separated by filtration and dried in air. Hydrolysis of this interpolymer is carried out by treatment of its methanol solution with a solution containing 5% of potassium hydroxide dissolved in methanol. The hydrolyzed interpolymer of methyl methacrylate and vinyl acetate is isolated in the same manner as the hydrolyzed interpolymers in previous examples.

Five parts of the above hydrolyzed interpolymer is steeped in 20% sodium hydroxide solution overnight at 80°–90° C. The interpolymer is separated by collection on a filter and pressed to remove all excess caustic. The alkalized hydrolyzed interpolymer together with 6.3 parts of carbon disulfide is placed in a reactor which is shaken from time to time over a period of 4 hours at room temperature. The reaction mixture is then treated with an equal weight of water which causes part to dissolve. The resulting solution, which contains the sodium xanthate of the hydrolyzed methyl methacrylate-vinyl acetate interpolymer, deposits the hydrolyzed interpolymer upon acidification with hydrogen chloride. The xanthate solution can be incorporated in viscose to modify the properties of the yarn spun from the viscose.

*Example VII*

This example illustrates the preparation and xanthation of hydrolyzed vinyl chloride-vinyl acetate interpolymer.

Into a pressure vessel is introduced 6 parts of vinyl chloride, 54 parts of vinyl acetate, 111 parts of distilled water, 7.8 parts of sodium hexadecanol-1 sulfate, and 0.6 part of ammonium persulfate. The pressure vessel is agitated at 45° C. for 40 hours. The product, which contains 1 mol of vinyl chloride per 6.5 mols of vinyl acetate, is isolated and hydrolyzed as described in Example VI. Treatment of the above hydrolyzed interpolymer with carbon disulfide by the procedure described in Example VI produces a solution containing approximately 0.1% of the sodium xanthate of the hydrolyzed vinyl chloride-vinyl acetate interpolymer.

It is to be understood of course that the above examples are merely for purposes of illustration and that the invention is not limited to the exact reagents, conditions and procedures described therein, but is susceptible rather to wide modification and the substitution of a broad range of equivalents. Thus, a wide variety of polymerizable compounds containing a single ethylenic double bond, the terminal carbon atoms of which double bond are connected only to elements of the group consisting of hydrogen, carbon, halogen and nitrogen, can be interpolymerized with vinyl organic esters, such as vinyl acetate, vinyl butyrate, vinyl pimelate, vinyl isobutyrate, and vinyl benzoate; hydrolyzed; and xanthated to give new and useful compositions. These polymerizable compounds include methyl, ethyl, butyl, and higher homologous esters of acrylic, methacrylic, alpha-halogen acrylic, maleic, and fumaric acids. Other examples of such compounds which can be used include acrylonitrile, methacrylonitrile, methacrylamide, N-alkyl methacrylamide, N-vinyl imide, N-alkyl imide (n-butyl maleimide), vinyl chloride, vinyl bromide, vinylidene dichloride, trichloroethylene, isobutylene, ethylene, styrene, methyl vinyl ketone, and methyl isopropenyl ketone.

The molecular proportions of the polymerizable compound containing a single ethylenic double bond, the terminal carbon atoms of which double bond are connected only to elements of the group consisting of hydrogen, carbon, halogen and nitrogen, and the vinyl organic ester in the interpolymer that is hydrolyzed and then xanthated, may vary within wide limits depending upon the properties desired. The properties of the xanthates can be adjusted by partial or extensive xanthation of completely hydrolyzed interpolymer containing a large or small proportion of vinyl organic ester in relation to the other component selected from the classes of compounds already mentioned. These proportions vary for different interpolymers and depend upon the uses for which the compositions are to be employed, the properties of the hydrolyzed interpolymer, and the solubility of the xanthate. For example, in the ethylene-vinyl acetate hydrolyzed interpolymers, compositions in which the mol ratio is greater than 3/1 are not easily xanthated, whereas compositions in which the mol ratio is less than 1/20 are too water sensitive for many purposes. Preferred ranges in the various series of interpolymers vary widely, for they depend upon the properties conferred upon the interpolymer by the nature and amount of component other than vinyl alcohol in the hydrolyzed interpolymer. In general, hydrolyzed interpolymers derived from interpolymers containing less than 25 mols per cent of vinyl organic ester are not easily xanthated to give water-soluble derivatives.

A wide variety of salts of the xanthated hydrolyzed interpolymers of a vinyl organic ester with another polymerizable compound having a single ethylenic double bond the terminal carbon atoms of which double bond are connected only to elements of the group consisting of hydrogen, carbon, halogen and nitrogen, can be obtained. These salts can be prepared either by a metathesis reaction upon the sodium xanthate, e. g. with the use of cobalt chloride or barium hydroxide, or by the use of an alkaline reagent other than sodium hydroxide during their preparation, for instance, potassium hydroxide. By one of these methods it is possible to obtain salts of the metals of groups I, II, III, VI, and VIII of the periodic system.

The alkali alcoholates of the hydrolyzed interpolymers used in preparing the xanthates of this invention are most conveniently prepared at moderately elevated temperatures, e. g. 50 to 100° C. They can, however, be prepared at lower temperatures, for instance, 10 to 25° C., by prolonged steeping of the hydrolyzed interpolymer in caustic soda.

The degree of xanthation is preferably between 20 to 80% and can be controlled by regulating the amount of carbon disulfide used. Highly xanthated products, for instance, those in which 80% or more of the hydroxyls of the hydrolyzed interpolymer have been xanthated, are obtained by using a large excess of carbon disulfide.

The xanthation may be carried out in a variety of reaction chambers, the nature of which is not a part of this invention. It is, however, important that adequate agitation and temperature control be maintained and that conditions preventing loss of the reactants be used. Although xanthation can be carried out at temperatures ranging from about 0 to 100° C., it is preferred to use temperatures between 10 and 50° C. Below this range the reaction proceeds slowly while above 50° C. excessive amounts of by-products are formed.

Aqueous solutions of xanthates of hydrolyzed interpolymers of a vinyl organic ester with another polymerizable compound containing a single ethylenic double bond the terminal carbon atoms of which double bond are connected only to elements of the group consisting of hydrogen, carbon, halogen and nitrogen can be employed to form filaments, films, and tubes which are capable of being regenerated by heat or acid to give insoluble sheets of the hydrolyzed interpolymer. Such solutions may be incorporated directly into viscose to modify the properties of viscose yarn.

I claim:

1. The method of preparing a xanthate of a water-insoluble substantially completely hydrolyzed interpolymer of a vinyl ester of an organic carboxylic acid with another polymerizable compound containing a single ethylenic double bond the terminal carbon atoms of which double bond are connected only to elements of the group consisting of hydrogen, carbon, halogen and nitrogen, which comprises reacting an alkali metal alkoxide with said hydrolyzed interpolymer whereby to form an alkali alcoholate of said hydrolyzed interpolymer, and thereafter reacting the alkali alcoholate of said hydrolyzed interpolymer with carbon bisulfide whereby to form a polymeric xanthate.

2. The method of preparing a xanthate of a water-insoluble substantially completely hydrolyzed interpolymer of a vinyl ester of an organic carboxylic acid with another polymerizable compound containing a single ethylenic double bond the terminal carbon atoms of which double bond are connected only to elements of the group consisting of hydrogen, carbon, halogen and nitrogen, which comprises reacting said hydrolyzed interpolymer dissolved in an alcohol-benzene solvent with an alkali metal alkoxide, distilling the reaction mixture to remove the alcohol, separating the alkali alcoholate of the hydrolyzed interpolymer, and thereafter reacting said alkali alcoholate with carbon bisulfide whereby to form a polymeric xanthate.

3. The method of preparing a xanthate of a water-insoluble substantially completely hydrolyzed interpolymer of vinyl acetate with ethylene which comprises reacting a hydrolyzed interpolymer derived from an interpolymer of vinyl acetate with ethylene wherein the mol ratio of ethylene to vinyl acetate is within the range of from about 3/1 to about 1/20, with sodium ethylate in the presence of an ethanol-benzene mixture as solvent, distilling the reaction mixture to remove ethanol, separating the sodium alcoholate of said hydrolyzed interpolymer, and thereafter reacting said alcoholate with sufficient carbon bisulfide whereby to form a polymeric xanthate wherein from 20% to 80% of the hydroxyl groups in the original hydrolyzed interpolymer are xanthated.

4. The method of preparing a xanthate of a water-insoluble, substantially completely hydrolyzed interpolymer of vinyl acetate with ethylene, which comprises reacting an alkali metal alkoxide with said hydrolyzed interpolymer, whereby to form an alkali alcoholate of said hydrolyzed interpolymer, and thereafter reacting said alkali alcoholate with carbon bisulfide whereby to form a polymeric xanthate wherein from 20% to 80% of the hydroxyl groups in the original hydrolyzed interpolymer are xanthated.

5. The method of preparing a xanthate of a water-insoluble, substantially completely hydrolyzed interpolymer of vinyl acetate with ethylene derived from an interpolymer of vinyl acetate with ethylene wherein the mol ratio of ethylene to vinyl acetate is within the range of from about 3/1 to about 1/20, which comprises reacting an alkali metal alkoxide with said hydrolyzed interpolymer whereby to form an alkali alcoholate of said hydrolyzed interpolymer, and thereafter reacting said alkali alcoholate with carbon bisulfide whereby to form a polymeric xanthate wherein from 20% to 80% of the hydroxyl groups in the original hydrolyzed interpolymer are xanthated.

6. The product obtained in accordance with the process set forth in claim 8, said product being a xanthate of a water-insoluble, substantially completely hydrolyzed interpolymer of a vinyl ester of an organic carboxylic acid with ethylene, from 20% to 80% of the hydroxyl groups of said hydrolyzed interpolymer being xanthated.

7. The product obtained in accordance with the process set forth in claim 5, said product being a xanthate of a water-insoluble, substantially completely hydrolyzed interpolymer of vinyl acetate with ethylene, the mol ratio of ethylene to vinyl acetate in the interpolymer before hydrolysis having been within the range of from about 3/1 to 1/20, from 20% to 80% of the hydroxyl groups in said hydrolyzed polymer being xanthated.

8. The method of preparing a xanthate of a water-insoluble, substantially completely hydrolyzed interpolymer of a vinyl ester of an organic carboxylic acid with ethylene, which comprises reacting an alkali metal alkoxide with said hydrolyzed interpolymer, whereby to form an alkali alcoholate of said hydrolyzed interpolymer, and thereafter reacting said alkali alcoholate with carbon bisulfide whereby to form a polymeric xanthate wherein from 20% to 80% of the hydroxyl groups in the original hydrolyzed interpolymer are xanthated.

WILLIAM H. SHARKEY.